(12) United States Patent
Atsmon

(10) Patent No.: US 12,065,149 B2
(45) Date of Patent: Aug. 20, 2024

(54) SYSTEMS AND METHODS FOR EVALUATION OF VEHICLE TECHNOLOGIES

(71) Applicant: Cognata Ltd., Rehovot (IL)

(72) Inventor: Alon Atsmon, Kiryat Ono (IL)

(73) Assignee: Cognata Ltd., Rehovot (IL)

( * ) Notice: Subject to any disclaimer, the term of this patent is extended or adjusted under 35 U.S.C. 154(b) by 363 days.

(21) Appl. No.: 17/440,257

(22) PCT Filed: Mar. 17, 2020

(86) PCT No.: PCT/IL2020/050316
§ 371 (c)(1),
(2) Date: Sep. 17, 2021

(87) PCT Pub. No.: WO2020/188562
PCT Pub. Date: Sep. 24, 2020

(65) Prior Publication Data
US 2022/0153279 A1   May 19, 2022

Related U.S. Application Data

(60) Provisional application No. 62/819,692, filed on Mar. 18, 2019.

(51) Int. Cl.
*G05D 1/00* (2006.01)
*B60W 40/04* (2006.01)
(Continued)

(52) U.S. Cl.
CPC ............ *B60W 40/08* (2013.01); *B60W 40/04* (2013.01); *B60W 50/0097* (2013.01);
(Continued)

(58) Field of Classification Search
CPC .. B60W 40/08; B60W 40/04; B60W 50/0097; B60W 2540/043; B60W 2556/10; B60W 2050/0075; G06Q 40/08
See application file for complete search history.

(56) References Cited

U.S. PATENT DOCUMENTS 8,660,734 B2   2/2014   Zhu et al.
9,046,440 B2   6/2015   Staehlin et al.
(Continued)

FOREIGN PATENT DOCUMENTS

DE   102010063792   6/2012
EP   3410382   12/2018
(Continued)

OTHER PUBLICATIONS

Supplementary European Search Report and the European Search Opinion Dated Mar. 21, 2023 From the European Patent Office Re. Application No. 20773894.9. (12 Pages).
(Continued)

*Primary Examiner* — Adam M Alharbi

(57) ABSTRACT

There is provided a system for adapting parameters of a vehicle for reduction of likelihood of an adverse event, comprising: hardware processor(s) executing a code for: performing, for each respective driver of multiple drivers: obtaining an indication of a vehicle driven by the respective driver, obtaining an indication of a certain advanced driver assistance system (ADAS) selected from multiple ADAS for installation in the vehicle, obtaining an environmental profile indicative of a prediction of an environment in which the vehicle with installed ADAS is predicted for driving therein at a future time interval, defining a simulation model in which the vehicle with installed ADAS is driving according to the environment profile, computing a risk of an adverse event during the future time interval by executing the simulation model, and selecting parameter(s) of the vehicle (Continued)

for adaptation thereof according to a predicted likelihood of reducing the risk of the adverse event.

20 Claims, 2 Drawing Sheets

(51) Int. Cl.
*B60W 40/08* (2012.01)
*B60W 50/00* (2006.01)
*G06Q 40/08* (2012.01)

(52) U.S. Cl.
CPC ..... *G06Q 40/08* (2013.01); *B60W 2050/0075* (2013.01); *B60W 2540/043* (2020.02); *B60W 2556/10* (2020.02)

(56) References Cited

U.S. PATENT DOCUMENTS

| | | | |
|---|---|---|---|
| 9,165,477 | B2 | 10/2015 | Wilson |
| 9,176,500 | B1 | 11/2015 | Teller et al. |
| 9,715,711 | B1 | 7/2017 | Konrardy et al. |
| 10,830,605 | B1 * | 11/2020 | Chintakindi ....... G01C 21/3484 |
| 2015/0310145 | A1 | 10/2015 | Nica et al. |
| 2020/0184591 | A1 * | 6/2020 | Balu ..................... G07C 5/006 |

FOREIGN PATENT DOCUMENTS

| | | | | |
|---|---|---|---|---|
| JP | 2018152056 A | * | 9/2018 | .......... B60W 30/085 |
| WO | WO 2020/188562 | | 9/2020 | |

OTHER PUBLICATIONS

Yao et al. "Autonomous-Driving Vehicie Test Technology Based onv Virtuai Reality", The Journal of Engineering, 2018(16): 1768-1771, Nov. 1, 2018.

International Preliminary Report on Patentability Dated Sep. 30, 2021 From the International Bureau of WIPO Re. Application No. PCT/IL2020/050316. (11 Pages).

International Search Report and the Written Opinion Dated Aug. 6, 2020 From the International Searching Authority Re. Application No. PCT/IL2020/050316. (12 Pages).

* cited by examiner

SYSTEMS AND METHODS FOR EVALUATION OF VEHICLE TECHNOLOGIES

RELATED APPLICATIONS

This application is a National Phase of PCT Patent Application No. PCT/IL2020/050316 having International filing date of Mar. 17, 2020, which claims the benefit of priority under 35 USC § 119(e) of U.S. Provisional Patent Application No. 62/819,692 filed on Mar. 18, 2019. The contents of the above applications are all incorporated by reference as if fully set forth herein in their entirety.

BACKGROUND

The present invention, in some embodiments thereof, relates to vehicle technologies and, more specifically, but not exclusively, to systems and methods for evaluation of vehicle technologies.

Vehicle technologies are being developed in an effort to improve road safety, for example, reducing risk of accidents with the vehicle, and reducing risk of hitting pedestrians with the vehicles. Vehicle technologies may be simple, for example, a reverse sensor that generates an alert when the vehicle is too close to another vehicle behind it, which may help prevent small fender benders during parking. Other vehicle technologies are more sophisticated, for example, camera based devices that capture images of the road ahead, and generate warning, for example, when pedestrians are crossing the road, when the vehicle is swerving out of its lane, and when the vehicle is too close to the vehicle ahead.

SUMMARY

According to a first aspect, a system for adapting parameters of a vehicle for reduction of likelihood of an adverse event, comprises: at least one hardware processor executing a code for: performing, for each respective driver of a plurality of drivers: obtaining an indication of a vehicle driven by the respective driver, obtaining an indication of a certain advanced driver assistance system (ADAS) selected from a plurality of ADAS for installation in the vehicle, obtaining an environmental profile indicative of a prediction of an environment in which the vehicle with installed ADAS is predicted for driving therein at a future time interval, defining a simulation model in which the vehicle with installed ADAS is driving according to the environment profile, computing a risk of an adverse event during the future time interval by executing the simulation model, and selecting at least one parameter of the vehicle for adaptation thereof according to a predicted likelihood of reducing the risk of the adverse event.

According to a second aspect, a system for evaluation of likelihood of an adverse event of a vehicle, comprising: at least one hardware processor executing a code for: performing, for each respective driver of a plurality of drivers: obtaining an indication of a vehicle driven by the respective driver, obtaining an indication of a certain advanced driver assistance system (ADAS) selected from a plurality of ADAS for installation in the vehicle, obtaining an environmental profile indicative of a prediction of an environment in which the vehicle with installed ADAS is predicted for driving therein at a future time interval, defining a simulation model in which the vehicle with installed ADAS is driving according to the environment profile, and computing a risk of an adverse event during the future time interval by executing the simulation model.

According to a third aspect, a method for adapting parameters of a vehicle for reduction of likelihood of an adverse event, comprising: performing, per driver of a plurality of drivers: obtaining an indication of a vehicle driven by the driver, obtaining an indication of a certain advanced driver assistance system (ADAS) selected from a plurality of ADAS for installation in the vehicle, obtaining an environmental profile indicative of a prediction of an environment in which the vehicle with installed ADAS is predicted for driving therein at a future time interval, defining a simulation model in which the vehicle with installed ADAS is driving according to the environment profile, computing a risk of an adverse event during the future time interval by executing the simulation model, and selecting at least one parameter of the vehicle for adaptation thereof according to a predicted likelihood of reducing the risk of the adverse event.

In a further implementation form of the first, second, and third aspects, the method further comprising and/or the system further comprising code for: generating instructions for adaptation of the selected at least one parameter of the vehicle.

In a further implementation form of the first, second, and third aspects, the method further comprising and/or the system further comprising code for computing an insurance premium for insuring the vehicle having the ADAS installed therein.

In a further implementation form of the first, second, and third aspects, the insurance premium is computed according to the risk of adverse event computed by executing the simulation model.

In a further implementation form of the first, second, and third aspects, the insurance premium is computed for the future time interval of the executed simulation model.

In a further implementation form of the first, second, and third aspects, the method further comprising and/or the system further comprising code for: creating an updated simulation model by updating the simulation model in which the vehicle with installed ADAS is adapted according to the selected at least one parameter, and computing an updated risk of the adverse event by executing the updated simulation model.

In a further implementation form of the first, second, and third aspects, the method further comprising and/or the system further comprising code for computing an insurance premium for insuring the vehicle having the ADAS installed therein and wherein the vehicle is adapted according to the selected at least one parameter.

In a further implementation form of the first, second, and third aspects, the method further comprising and/or the system further comprising code for selecting another at least one parameter of the vehicle for adaptation thereof according to a predicted likelihood of further reducing the risk of the adverse event.

In a further implementation form of the first, second, and third aspects, the method further comprising and/or the system further comprising code for iterating the creating the updated simulation model, the computing the updated risk, and the re-selecting another at least one parameter until the risk of the adverse event is below a defined threshold.

In a further implementation form of the first, second, and third aspects, the at least one parameter of the vehicle is selected according to an analysis of the executed simulation model that identifies the predicted likelihood of reducing the risk of the adverse event according to the executed simulation model.

In a further implementation form of the first, second, and third aspects, the analysis of the executed simulation model comprises identifying at least one parameter of the vehicle during at least one of: a simulation of occurrence of the adverse event during execution of the simulation model, and simulation of a near occurrence of the adverse event during execution of the simulation model.

In a further implementation form of the first, second, and third aspects, the analysis of the executed simulation model comprises identifying at least one parameter of the vehicle that deviates from a defined requirement during execution of the simulation model.

In a further implementation form of the first, second, and third aspects, the selected at least one parameter of the vehicle for adaptation thereof comprises selecting another ADAS system from the plurality of ADAS for installation in the vehicle.

In a further implementation form of the first, second, and third aspects, the selected at least one parameter of the vehicle for adaptation thereof comprises at least one parameter of a sub-system selected from the group consisting of: driving sub-system, navigation sub-system, multimedia sub-system, and phone sub-system.

In a further implementation form of the first, second, and third aspects, the selected at least one parameter of the vehicle for adaptation thereof is selected from the group consisting of: adapting of multimedia for use by the driver during driving, set maximum speed limit, define prohibited driving regions.

In a further implementation form of the first, second, and third aspects, the environmental profile includes one or more parameters selected from the group consisting of: prediction of weather, prediction of vehicle traffic, prediction of pedestrian movement, and prediction of lighting conditions.

In a further implementation form of the first, second, and third aspects, the method further comprising and/or the system further comprising code for obtaining a driver profile of a generic driver based on at least one demographic profile.

In a further implementation form of the first, second, and third aspects, the method further comprising and/or the system further comprising code for obtaining a driver profile of the driver of the plurality of drivers, including at least one demographic parameter of the driver, a driving history of the driver, and a driving region, wherein the simulation model is defined for the vehicle with installed ADAS being driven by a driver according to the driver profile.

In a further implementation form of the first, second, and third aspects, the method further comprising and/or the system further comprising code for selecting a predefined model of a driver from a plurality of predefined driver models by a trained classifier according to the driver profile, wherein the simulation model is defined for the vehicle with installed ADAS being driven by the selected predefined model of the driver.

In a further implementation form of the first, second, and third aspects, the predefined model of the driver is based on an aggregation of monitoring data collected by a monitoring device for a plurality of drivers during actual driving of vehicles having the ADAS system installed therein.

In a further implementation form of the first, second, and third aspects, the at least one parameter for adaptation of the vehicle is selected according to an analysis of historical driving data collected from a plurality of monitoring devices monitoring a plurality of drivers during actual driving of vehicles having the ADAS system installed therein and wherein the vehicle is adapted according to the at least one parameter, the predicted likelihood of reducing the risk of the adverse event computed according to the analysis of the historical driving data.

In a further implementation form of the first, second, and third aspects, the adverse event is selected from the group consisting of: accident caused by the driver of the vehicle, accident to the vehicle caused by another vehicle, no-fault damage to the vehicle due to environmental factors and not due to other vehicles.

In a further implementation form of the first, second, and third aspects, the vehicle is a non-automated vehicle that is actively controlled and driven by the driver.

In a further implementation form of the first, second, and third aspects, the method further comprising and/or the system further comprising code for obtaining at least one of: a model of the vehicle, a sub-model of the vehicle, at least one feature installed in the vehicle, and at least one upgrade feature installed in the vehicle.

In a further implementation form of the first, second, and third aspects, the method further comprising and/or the system further comprising code for obtaining a driver profile, including a demographic parameters of the driver, a driving history of the driver, and a driving region, wherein the simulation model is defined for the vehicle with installed ADAS being driven by a driver according to the driver profile.

In a further implementation form of the first, second, and third aspects, the method further comprising and/or the system further comprising code for computing an insurance premium for insuring the vehicle having the ADAS installed therein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
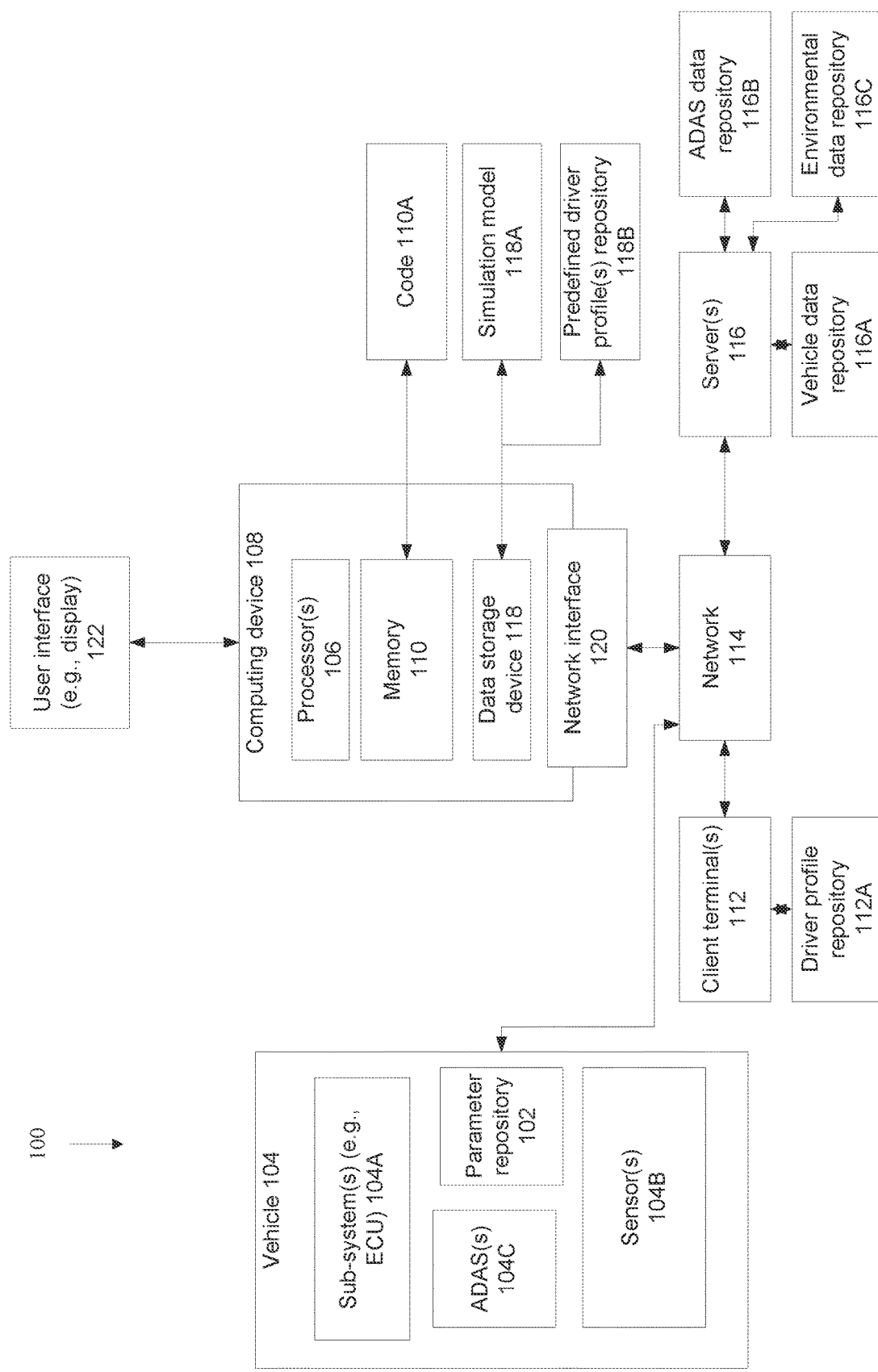
FIG. 1 is a block diagram of a system for adapting parameters of a vehicle for reduction of likelihood of an adverse event, in accordance with some embodiments of the present invention.

The present invention, in some embodiments thereof, relates to vehicle technologies and, more specifically, but not exclusively, to systems and methods for evaluation of vehicle technologies.

As used herein, the term vehicle means a machine that transports people or objects mainly on land. Exemplary vehicles include: cars, trucks, electric bicycles, motorcycles, busses, forklifts, snow plows, snowmobiles, off road vehicles, and hovercraft. The vehicle may be a standard manual car, or a semi-automatic car. A driver takes an active role in driving the vehicle, such that the driver plays a critical role in directing the vehicle. The driver may provide active control of the vehicle. The driver may provide continuous active control of the vehicle, or partial active control of the vehicle where some driving parts are automated, for example, automatic driving during cruising control activation on the highway, and automated parking. Optionally, the vehicle is defined by a vehicle model (which may include a year of manufacturing) and/or sub-model (e.g., variation of the model, for example, different installed engine, different number of seats) and/or include one or more additional installed features, optionally installed upgrades (e.g., multimedia system, leather seats, special paint, chrome wheels, spoiler).

Optionally, the term vehicle is a non-automated vehicle. The term vehicle may exclude automated cars in which the driver does not actually actively drive the vehicle, but the vehicle automatically drives itself. Alternatively, the term vehicle includes an automated vehicle, in which the driver plays a minimal or partial role.

As used herein, the term adverse event means an event in which damage to property or persons occurs, for example, an accident and/or collision, such as accident caused by the driver of the vehicle, accident to the vehicle caused by another vehicle, and no-fault damage to the vehicle due to environmental factors and not due to other vehicles. Exemplary adverse events involve one or more of: damage to vehicle, damage to persons in the vehicle (e.g., driver, passengers), damage to other vehicles, damage to pedestrians, damage to other persons in other vehicles, damage to property external to the vehicle (e.g., power line poles, houses, fences). Exemplary adverse events include: the vehicle hitting other vehicles and/or property while driving, the vehicle being hit by other vehicles while driving, the vehicle being damaged by other vehicles and/or vandalized while being parked, the vehicle being damaged by extreme weather (e.g., flood, hurricane, ice storm), the vehicle being damaged by itself (e.g., hitting a wall, falling off a cliff, falling into a ditch, falling into water).

As used herein, the term advanced driver assistance system (ADAS) means systems designed to help the driver drive better, by increasing road safety and/or car safety, i.e., reducing likelihood of adverse events. ADAS are designed with the goal of reducing human error of the driver, which may lead to adverse events. ADAS may automate some driving tasks, may adapt some driving tasks, and/or may enhance some driving tasks. For example, ADAS may generate alerts to the driver warning of a dangerous scenario likely to result in an adverse event, for example, vehicle drifting out of its lane, pedestrians crossing the street, and a distance to the car ahead is too close. ADAS may perform automated tasks when a dangerous scenario is automatically detected, for example, automated braking when the distance to the car ahead is decreasing, and automated steering of the vehicle to avoid a collision. Other ADAS systems may attempt to increase safety, for example, by automatically turning on lights, automatically turning on windshield wipers, automatically activating a hands free call during driving (to avoid the driving handling the phone), monitoring blind spots, and rear view cameras, and ignition lock devices that require the driver to prove that a breath alcohol level is below a threshold before starting the car.

As used herein, the term simulation model is used to perform a computer based imitation of a real world vehicle being driven by the driver. The imitation is of the real world vehicle having a real world ADAS installed (according to the selected ADAS) as defined by the simulation model, and of the real world environmental conditions as defined by the environmental profile of the simulation model. The imitation may be of the real world vehicle being driven by a real world driver as defined by the driver profile. The simulation is performed by executing the simulation model over a virtual future time interval, which denotes a prediction of future events over the future time interval.

As used herein, the term simulation may be interchanged with the phrase execution of the simulation model.

As used herein, the term parameter(s) (i.e., of the vehicle for adaptation thereof) refers to manual setting and/or automated settings of one or more existing vehicle sub-systems, and/or installation of a new vehicle sub-system, and/or removal of an existing vehicle sub-system. For example, parameters of the following vehicle-sub-systems may be adjusted: driving sub-system, navigation sub-system, multimedia sub-system, and phone sub-system. Exemplary adjustments of the parameters of the vehicle sub-systems may include: adapting of multimedia for use by the driver during driving, set maximum speed limit, define prohibited driving regions (e.g., no highway driving, no downtown city driving, no driving out of state), define prohibited driving practices (e.g., no driving late at night, no driving during bad weather, no driving with breath alcohol level above a threshold, maximum number of hours of continuous driving). In another example, the adjustable parameters refer to installation of a new ADAS, which may include, for example, installation of one or more additional ADAS in addition to an existing ADAS, upgrade of an existing ADAS, installation of one or more ADAS where none are currently installed, replacement of the existing ADAS with a new type of ADAS, and removal of a current ADAS (e.g., in cases where the ADAS leads to increased risk of adverse event rather than lowering the risk of adverse event).

As used herein, the term driver profile refers to parameters associated with the respective driver that are used for simulating the driver driving the vehicle. Exemplary driver parameters of the driver profile include: demographic parameters of the driver (e.g., age, gender, income, education), health condition of the driver (e.g., mild dementia, vision, heart problems), a driving history of the driver (e.g., number of driving years, number and/or type of accidents, number and/or type of traffic violations), and a driving region (e.g., geographic location where the driver is predicted to drive the vehicle). The driving region may be used to define the geographical region for which the environmental profile is obtained. Optionally, the driver profile corresponds to a certain human driver driving the vehicle. Alternatively or additionally, the driver profile represents a generic driver indicative of multiple possible human drivers. The generic driver may be defined by one or more selected demographic parameters (e.g., age, income, gender, occupation, geographic location, hobbies), or may not be limited to any demographic parameters (i.e., any possible driver).

As used herein, the term environmental profile defines one or more predicted environmental conditions that are used for simulating the driving of the vehicle by the respective driver. The environmental profile is defined, for the geographical location at which the vehicle is predicted to be driven by the driver over the future time interval that is being simulated. The geographical location may be defined by the driver profile. The geographical location includes the roads on which the vehicle is predicted to drive on, and/or nearby geographical areas, for example, which may be affected by weather such as hills leading to floods. Exemplary environmental conditions defined by the environmental profile include: prediction of weather (e.g., sun, wind, rain, snow, hurricane, flood, overcast sky), prediction of vehicle traffic, prediction of pedestrian movement, and prediction of lighting conditions (e.g., presence and/or quality of street lights for night illumination, amount of sun such as in northern latitudes in the winter, and heavy snowfall leading to poor visibility).

An aspect of some embodiments of the present invention relates to systems, methods, apparatus, and/or code instructions (i.e., stored on a memory executable by hardware processor(s)) for selecting parameters of a vehicle for adaptation for reduction of likelihood of an adverse event, where the risk of adverse event is computed by executing a simulation model. The simulation model is defined, for each respective driver, to include the vehicle installed with a certain ADAS selected from multiple available ADAS, where the vehicle is driven according to an environmental profile. A risk of an adverse event during a future time interval is computed by executing the simulation model. The parameters of the vehicle for adaption thereof are selected according to a predicted likelihood of reducing the risk of adverse events.

Optionally, the respective driver is represented by one or more specific human drivers that are driving the vehicle. Alternatively or additionally, the respective driver is a generic driver representing multiple candidate drivers, without necessarily representing a specific human driver.

Optionally, the selected parameters are automatically adapted in one or more vehicle sub-systems (e.g., ECUs).

Optionally, the simulation is according to a driver profile of the driver. The driver profile may be defined for one or more specific human drivers, and/or may be defined for a generic driver(s) which may be represented by a combination of one or more demographic parameters.

Optionally, the ADAS most likely to reduce the risk of adverse event is selected by executing the simulation multiple times, where at each iteration another ADAS installed in the vehicle is defined by the simulation model. The ADAS resulting to the lowest risk of adverse event may be selected for installation in the vehicle.

Optionally, the simulation model is updated with an implementation of the selected adapted parameters to create an updated simulation model. The updated simulation model is executed to compute the risk of adverse event and/or additional parameters for adaptation. The updating of the simulation model and simulation thereof may be integrated, for example, until no additional parameters are identified for adaption which are predicted to further reduce risk of adverse event.

An aspect of some embodiments of the present invention relates to systems, methods, apparatus, and/or code instructions (i.e., stored on a memory executable by hardware processor(s)) for evaluation of likelihood of an adverse event occurring to a vehicle of a respective driver, computed by executing a simulation model. The simulation model is defined, for each driver, to include the vehicle installed with a certain ADAS selected from multiple available ADAS, where the vehicle is driven according to an environmental profile. A risk of an adverse event during a future time interval is computed by executing the simulation model.

At least some of the systems, methods, apparatus, and/or code instructions described herein relate to the technical problem of evaluating likelihood of an adaption of one or more parameters of a vehicle in reducing risk of a future adverse event, for example, an accident. Although many systems have been developed with the goal of reducing adverse events, for example, ADAS, the actual impact of such systems remains unknown. For example, it is unknown if such ADAS systems actually do reduce risk of adverse event in comparison to no installed ADAS, or the magnitude of a reduction in risk of adverse event. Moreover, it is unknown whether one type of ADAS available from one manufacturer is better than another type of ADAS available from another manufacturer in terms of reducing risk of adverse event. Furthermore, it is unknown if some types of ADAS actually increase of adverse events, for example, when used by some drivers and/or under certain environmental conditions. For example, drivers relying too much on the ADAS during bad weather, thereby resulting in greater risk of accident. In addition, it is not known if changing other parameters of the vehicle reduce or increase risk of adverse events, and if so under what conditions, and which parameters provide the greatest benefits. For example, it is unknown whether programming the vehicle to set a maximum speed limit and define prohibited driving zones are of benefit in reducing risk of adverse event and if so by how much and/or to which drivers would benefit most.

It is noted that insurance premiums may be charged and/or adjusted according to the evaluated risk, in view of implementing the adaption(s) to the vehicle. For example, vehicles having one type of ADAS installed therein computed as having a high likelihood of reducing adverse events may be granted a larger discount than other vehicles having a different type of ADAS installed therein computed as having a relatively lower likelihood of reducing risk of adverse event. Moreover, vehicle owner may be provided with an option to make adaptations to their vehicles in return for lower insurance premiums for adaptations computed as having a significantly likelihood of preventing adverse events. For example, defining a maximum speed limit for the vehicle.

At least some of the systems, methods, apparatus, and/or code instructions described herein improve the utilization of new vehicle related technologies (e.g., ADAS, adaptation of one or more vehicle parameters) for reducing risk of adverse events. By simulating a vehicle in which the new vehicle related technology has been installed (optionally according to predicted environmental conditions and/or based on a profile of the driver), the risk of adverse event to the vehicle in which the new technology has been installed may be predicted. Different vehicle technologies may show different effects on likelihood of adverse events in different vehicles, under different environmental conditions, and/or when driven by different drivers with different profiles. Different vehicle related technologies may be evaluated to determine the effect on prediction of likelihood of adverse events, which may be used to select the technology deemed to be most effect for the predicted driving scenario (e.g., in terms of vehicle, driver, and/or environmental conditions).

At least some of the systems, methods, apparatus, and/or code instructions described herein improve new vehicle technologies in terms of the ability of the new vehicle technologies to reduce risk of adverse events. Current practice is based on manual selection of such technologies, most often based on a gut instinct, as to which technology one "feels" will reduce risk of adverse events. Evidence related to reducing of risk of adverse events is lacking, especially quantitative measures of how much each technology actually reduces risk of adverse events, and/or in which scenarios such technologies should be implemented. The simulation performed by at least some of the systems, methods, apparatus, and/or code instructions described herein provides an objective, repeatable, and quantitative process for evaluating such new vehicle technologies, optionally for specific driver profiles, and/or specific predicted environmental conditions. The simulation enables selection of the vehicle technologies predicted to result in the greatest reduction of risk of adverse events in a scientific, evidence based, objective, and measurable manner, as opposed to a "gut feel".

At least some of the systems, methods, apparatus, and/or code instructions described herein provide an improvement over existing methods that evaluate risk of adverse event based on a retrospective analysis of adverse events. Such methods collect data of actual adverse events after they have occurred, and attempt to predict future risk based on historical results. The improvement provided by at least some of the systems, methods, apparatus, and/or code instructions described herein over such retrospective methods includes, for example, (i) the simulation is based on predicted future factors such as predicted environmental conditions which may be different than historical environmental conditions; (ii) the simulation may be performed for specific factors, such as for a specific vehicle, using a specific new vehicle technology, for a specific driver profile, for a specific predicted environment, for which retrospective data may not available and/or may be insufficient; (iii) the simulation may be iterated multiple times for selection of the new technologies that are predicted to result in the greatest reduction of likelihood of adverse event, such analysis cannot be performed using retrospective data; (iv) the simulation may be performed to simulated extremely long driving distances, which cannot be obtained by human drivers, for example, simulating driving over millions or billions of driving kilometers; (v) the simulation may be repeated multiple times for the same simulation model, to enable computation of the adverse event, for example, the number of simulations in which adverse event(s) occurred divided by the total number of simulations.

At least some of the systems, apparatus, methods, and/or code instructions described herein address a technical problem that is unique to the technological context of new vehicle technologies such as ADAS and/or programmable vehicle parameters. Such technological context only recently arose due to improvements in computing technology and does not have a long standing counterpart in the physical world. The technical problem described herein in relatively new, and recently arose due to the wide adoption of ADAS in vehicles with the expectation that such ADAS reduces risk of adverse events and/or to the rise of semi-automated and/or smart vehicles with programmable features. The technical solution provided by at least some of the systems, apparatus, methods, and/or code instructions described herein is addressed by the specific technological context of ADAS, semi-automated and/or smart vehicles with programmable features.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
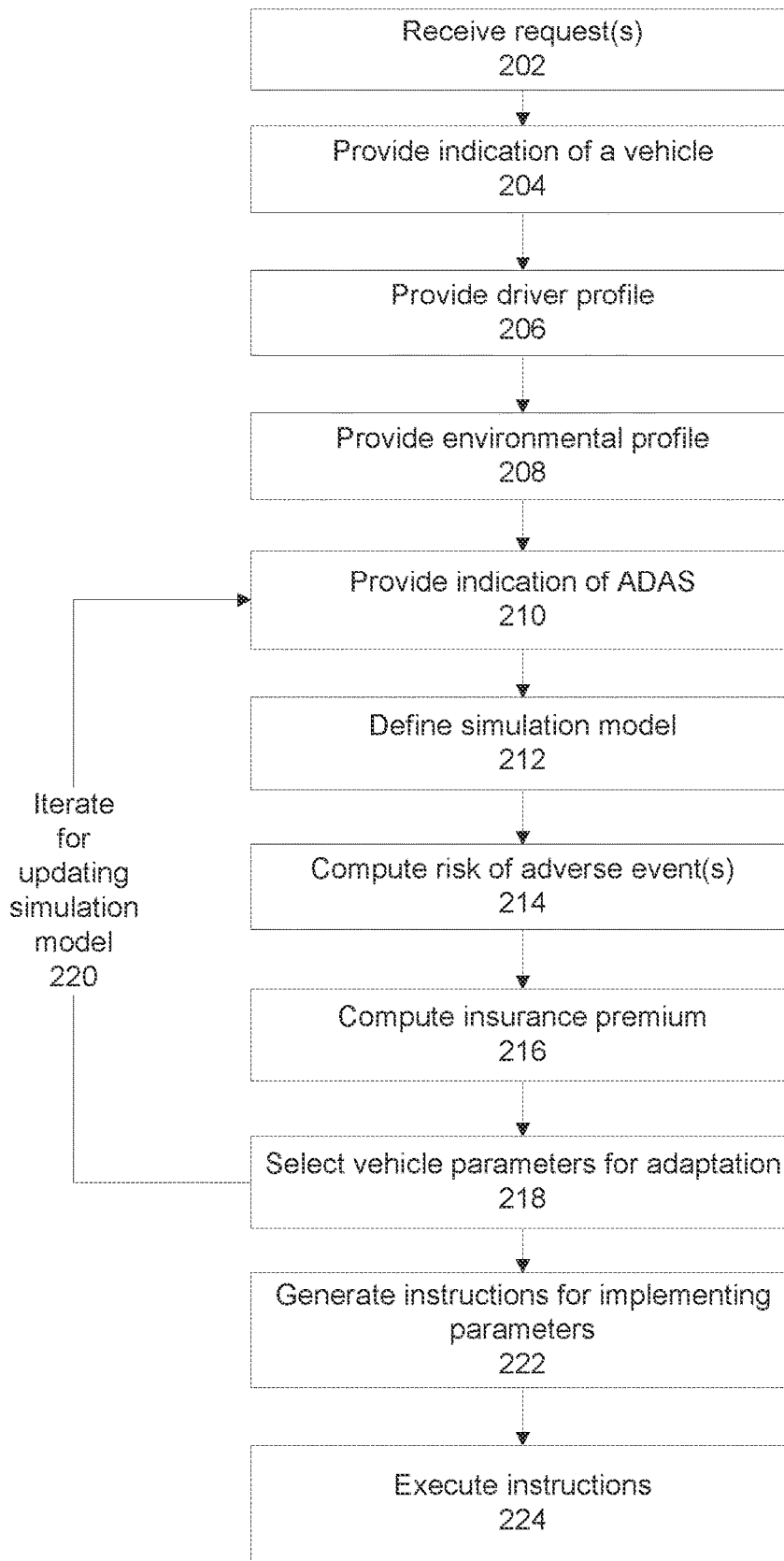
FIG. 2 is a flowchart of a method for adapting parameters of a vehicle for reduction of likelihood of an adverse event, in accordance with some embodiments of the present invention.

Reference is now made to FIG. 1, which is a block diagram of a system 100 for adapting parameters (e.g., stored in a parameter repository 102) of a vehicle 104 for reduction of likelihood of an adverse event, in accordance with some embodiments of the present invention. Reference is also made to FIG. 2, which is a flowchart of a method for adapting parameters of a vehicle or reduction of likelihood of an adverse event, in accordance with some embodiments of the present invention. System 100 may implement one or more features described with reference to FIG. 2, for example, by processor(s) 106 of a computing device 108 executing code instructions (e.g., code 110A) stored in a memory 110 (also referred to herein as a program store and/or data storage device).

Computing device 108 may be implemented as, for example one or more and/or combination of: a group of connected devices, a client terminal, a server, a computing device installed within vehicle 104 (e.g., a vehicle subsystem, a vehicle ECU, a client device connected to a vehicle network, code installed on an existing vehicle computing component), a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 100 based on computing device 108 may be implemented. For example:

Computing device 108 may be implemented as one or more servers (e.g., network server, web server, a computing cloud, a virtual server, a network node) that provides services to multiple client terminals 112 over a network 114, for example, software as a service (SaaS), remote services provided to multiple different entities (e.g., of different organization), and centralized services provided to multiple client terminals of a same entity (e.g., same organization). Such architecture may provide services to many different client terminals 112. Communication between client terminal(s) 112 and computing device 108 over network 114 may be implemented, for example, via an application programming interface (API), software development kit (SDK), functions and/or libraries and/or add-ons added to existing applications executing on client terminal(s), an application for download and execution on client terminal 112 that communicates with computing device 108, a remote access section executing on a web site hosted by computing device 108 accessed via a web browser executing on client terminal(s) 112.

Computing device 108 may be implemented as a stand-alone device (e.g., kiosk, client terminal, smartphone, server, computing cloud, virtual machine) that includes locally stored code that implement one or more of the acts described with reference to FIG. 2. For example, code loaded onto a dedicated server (e.g., of a same organization) that is connected to client terminal 112A via communication network 114. In another example, computing device 108 is implemented as a kiosk (e.g., located in a mall) for use by different users. In such implementation, communication with client terminal(s) 112 and/or sever(s) 116 and/or communication network 114 is not necessarily required. Such architecture may provide dedicated services to defined users.

Computing device 108 may be implemented as a component installed within vehicle 104, for example, a dedicated component of vehicle subsystem(s) 104A and/or vehicle ECU, a client device connected to a vehicle network (e.g., directly connected via a cable connected, and/or connected via a temporary wireless network), and/or code installed on an existing vehicle computing component. Such architecture may provide dedicated services to each vehicle, for example, real-time adaptation of parameters stored in parameter repository 102, for example, based on a predication according to an analysis of real time and/or historical data outputted by vehicle sensor(s) 104B.

Computing device 108 may receive a request from client terminal(s) 112 for computing the risk of adverse event and/or for computing the parameters of the vehicle for adaptation. The driver profile for which the risk of adverse events and/or the parameters are computed may be provided by client terminal(s) 112, for example, stored in a driver profile repository 112A. Real data (e.g., historical and/or real time) of the vehicle and/or driver outputted by sensor(s) 104B of vehicle 104 may be provided to computing device 108 for used in the prediction simulation, for example, over network 114, and/or via client terminal 112 over network 114. Computing device 108 may access external server(s) 116 to obtain additional data for computation of the risk of adverse events and/or the parameters for adaptation. Server(s) 116 may store one or more of the following datasets: vehicle repository data 116A storing data for simulation of the vehicle, ADAS repository 116B storing data indicative of one or more ADAS for simulation thereof, and environmental repository 116C storing data for simulation of predicted environmental conditions. Alternatively or additionally, one or more of data 116A-C may be locally stored by computing device 108. Computing device 108 may locally execute the simulation according to code of a simulation model 118A and/or based on predefined driver profile(s) stored in a predefined driver profile repository 118B. Alternatively or additionally, driver profile repository 118B may be stored on one or more servers 116 accessed over network 114.

Parameters of vehicle 104 (e.g., stored in parameter repository 102) may be automatically implemented based on the adjustment of the parameters computed by computing device 108. Instructions for adaptation of parameters 102 may be computed by computing device 108.

Sub-systems 104A of vehicle 104 include components that may be adapted and/or controlled according to parameters stored in parameter repository 102, and/or components that are monitored by sensor(s) 104B. Exemplary sub-system 104A include: navigation sub-system, braking sub-system, multimedia sub-system, car phone sub-system, and emergency handling sub-system.

ADAS 104C may be already installed in vehicle 104. Alternatively or additionally, ADAS 104C is selected according to computations of computing device 108 as described herein, for example, for reducing risk of future adverse events. ADAS 104C may be adapted according to parameters stored in parameter repository 102.

Sensor(s) 104B include sensors that monitor the driver and/or vehicle 104, and/or monitor sub-system(s) 104A. Data outputted by sensor(s) 104B may be used, for example, to create a profile for the driver for simulation thereof. Data outputted by sensor(s) 104B may be collected from multiple vehicles and/or drivers, optionally aggregated, analyzed, and used for prediction based on the simulation, as described herein. Exemplary sensor(s) 104B include: driver navigation, driver steering, driver activation and/or use of multimedia system, and driver braking.

Parameter repository 102 may be stored in a memory and/or other data storage device of vehicle 104. Values of parameters may be stored in respective sub-systems 104A of vehicle 104.

Hardware processor(s) 106 of computing device 108 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 106 may include a single processor, or multiple processors (homogenous or heterogeneous) arranged for parallel processing, as clusters and/or as one or more multi core processing devices.

Memory 110 stores code instructions executable by hardware processor(s) 106, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 110 stores code 110A that implements one or more features and/or acts of the method described with reference to FIG. 2 when executed by hardware processor(s) 106.

Computing device 108 may include data storage device(s) 118 for storing data, for example, code of simulation model 118A that is executed to compute likelihood of an adverse event (as described herein), and/or predefined driver profile repository 118B that stores code of predefined driver profiles that are used for simulation of the driver by simulation model 118A, as described herein. Data storage device(s) 118 may be implemented as, for example, a memory, a local hard-drive, virtual storage, a removable storage unit, an optical disk, a storage device, and/or as a remote server and/or computing cloud (e.g., accessed using a network connection). Portions of (or all of) data stored by data storage device(s) 118 may be loaded into memory 110 for execution by processor(s) 106.

Network 114 may be implemented as, for example, the internet, a local area network, a virtual network, a wireless network, a cellular network, a local bus, a point to point link (e.g., wired), and/or combinations of the aforementioned.

Computing device 108 may include a communication network interface 120 for connecting to communication network 114, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 108 and/or vehicle 104 and/or client terminal(s) 112 and/or server(s) 116 include and/or are in communication with one or more physical user interfaces 122 that include a mechanism for user interaction, for example, to provide and/or designate data for the simulation, and/or view the computed risk of adverse event and/or view the parameters selected for adaptation. Exemplary physical user interfaces 122 include, for example, one or more of, a touchscreen, a display, gesture activation devices, a keyboard, a mouse, and voice activated software using speakers and microphone.

Client terminal(s) 112 and/or server(s) 116 may be implemented as, for example, as a desktop computer, a server, a virtual server, a network server, a web server, a virtual machine, a thin client, and a mobile device.

Referring now back to FIG. 2, at 202, a request for selecting parameter(s) for adaption thereof is provided for a certain driver of multiple drivers. Multiple requests may be received, each request for a respective driver. Multiple requests may be received for the same driver, for example, for different vehicles driven and/or owned by the driver.

The request is provided, for example, to assist the driver with selecting the ADAS most likely to reduce adverse events, for defining the parameters and/or adjustment of the parameters most likely to reduce adverse events.

At 204, an indication of a vehicle driven by the driver is provided and/or received. The indication of the vehicle denotes, for example, the manufacturer and/or model and/or sub-model and/or features installed in the vehicle (e.g., upgrade features, for example, selected color, multimedia system, chrome wheels, and spoiler). The indication of the vehicle denotes a model of the vehicle, which is used to define the simulation model for simulation of driving of the vehicle, as described herein.

The indication of the vehicle may be selected from a list of defined vehicles (and/or models and/or sub-models and/or feature), and/or may be entered manually and/or automatically, for example, via a graphical user interface (GUI), via a scanning of a barcode, via automated character recognition and/or analysis of an invoice (e.g., obtained as part of the purchase of the vehicle).

Indications of multiple vehicles (e.g., used for simulation of the respective vehicle) may be stored, for example, by computing device 108, by server(s) 116, and/or by vehicle 104. The indication may be selected and/or provided, for example, by client terminal 112 (e.g., via the GUI), and/or downloaded from vehicle 104, and/or obtained from server(s) 116, and/or other data storage devices.

Indications of vehicles may be stored, for example, in vehicle data repository 116A. Each vehicle 104 may store its own indication, for example, in a memory, and/or in a sub-system 104A.

A model of the vehicle, optionally based on model, sub-model, and/or installed features (e.g., upgrade features) is defined by simulation thereof. The model may define the vehicle, for example, engine capabilities, steering handling, braking distance, position of headlights, weight of vehicle, height of chassis above the road, and the like. The model may be dynamically created based on the indication and/or selected from a set of stored models according to the indication, and/or a template model may be adapted based on the indications (e.g., template for a model of the vehicle, to which models of installed features are added). The model may be created, for example, by selecting a combination of sub-model template components and/or defining parameters of a template model. For example, for one manufacture, three engine templates may be defined, each engine template having parameters defining engine capabilities, which are customized according to the particular selected model.

At 206, the driver profile of the certain driver associated with the request may be obtained. The driver profile may be created by automatic extraction of data from other datasets and/or by manual entry of data. For example, the age, and driving history of the driver may be manually entered by a user into a GUI, and/or extracted from a dataset of previously acquired data of the driver. In another example, the driver profile may be created, for example, based on outputs of sensors (e.g., 104B) that monitor the driver during driving of the vehicle. Sensors may be, for example, installed in the vehicle (e.g., analyzing speed, braking patterns, driving patterns), located externally to the vehicle (e.g., cameras mounted on towers that capture images of the road) and/or located in standalone devices in the vehicle (e.g., analyzing data acquired by a smart phone, such as geographical location data, driving patterns, and speed).

The driver profile may be stored in a dataset storing driver profiles for each of multiple drivers, for example, driver profile repository 112A. The driver profile may be updated as new data is available, for example, dynamically by streaming sensor data, and/or updated in association with each new request for simulation.

Optionally, the driver profile denotes a generic driver profile, rather than a profile corresponding to a specific human driver. The generic driver profile may represent a certain demographic population defined by one or more demographic parameters, or not necessarily limited to any specific demographic parameters. Exemplary demographic parameters include: age, gender, geographic location (e.g., for living, and/or working and/or leisure), income, occupation, and hobbies. Exemplary generic driver profiles include: single male age 16-25, married female mother age 35-50, driver age 40-65 living in a suburb and making $50,000-$150,000 a year, and driver aged 18-22 attending an institute of higher education (e.g., college, university, trade school) and living in a city, and a generic driver not limited to any specific demographic parameters.

At 208, an environmental profile is obtained and/or provided and/or created. The environmental profile may be stored in environmental data repository 116C. The environmental profile may be created, for example, per geographical region. Such geographical and/or regional based environmental profiles may be re-used in multiple simulations of different drivers driving in the same geographical region.

The environmental profile may be created from one or more sources of environmental data, for example, traffic patterns (e.g., provided by a traffic server such as of a news station), and/or weather patterns (e.g., provided by a meteorological server).

The environmental provide may be computed as a prediction, optionally based on an analysis of historical patterns. For example, historical weather patterns may be used to predict future weather, optionally in view of current and/or predicted weather for the near future. Historical traffic patterns may be used to predict future traffic, for example, heavier traffic during heavy weather and during work hours, and lighter traffic during holidays and late at night.

The environmental profile may be dynamically updated according to recent environmental conditions, which are added to the dataset of historical environmental conditions, and used to predict future environmental conditions.

The environmental profile may be defined per future time interval, including predictions of environmental conditions for the upcoming future time interval, for example, for the next month, next year, starting in 3 months for a period of a 3 months, for morning hours for the next year, for night hours for the next 6 months, or other intervals.

At 210, an indication of one or more ADAS for installation in the vehicle and/or currently installed in the vehicle is provided and/or obtained. The ADAS may represent a real physical ADAS that is currently installed in the vehicle, and/or may represent a possible ADAS whose impact is being evaluated by the simulation for potential installation in the vehicle.

The indication of the ADAS denotes, for example, the manufacturer and/or model and/or sub-model and/or features of the ADAS. The indication of the ADAS denotes a model of the ADAS, which is used to define the simulation model for simulation of driving of the vehicle having the ADAS installed therein, as described herein.

The indication of the ADAS may be selected from a list of defined ADAS (and/or models and/or sub-models and/or feature), and/or may be entered manually and/or automatically, for example, via a graphical user interface (GUI), via a scanning of a barcode, via automated character recognition and/or analysis of an invoice (e.g., obtained as part of the purchase of the ADAS).

Indications of multiple ADAS (e.g., used for simulation of the respective vehicle) may be stored, for example, in ADAS repository 116B.

Each vehicle 104 may store an indication of ADAS(s) 104C installed therein, for example, in a memory of the ADAS, by querying the ADAS, and/or in a sub-system 104A.

At 212, a simulation model is defined. The simulation model may be stored as simulation model 118A.

The simulation model includes code for defining the vehicle with installed ADAS, driving according to the environment profile, optionally, being driven by a driver defined by the driver profile.

The simulation model may be a predefined model (e.g., code), with a set of parameters that define the vehicle, installed ADAS, environment profile, and optionally driver profile. The current vehicle, selected ADAS, relevant environment profile, and driver profile of the real driver may be provided as input into the simulation model, for example, as library files, values fed into input fields, and/or as options of the simulation model.

Optionally, a predefined model of a driver is selected from multiple predefined driver models (e.g., stored in predefined driver profile(s) repository 118B). The predefined model may be selected by a trained classifier according to the driver profile. For example, there may a limited number of defined driver profiles set for input into the simulation model. The number of possible combinations of values of the driver parameters of the driver profile may be extremely large, making it impractical to define a driver model for each combination. The classifier is trained on a training dataset of different combinations of values of driver parameters, and an associated label of one of the defined driver models (e.g., which may be manually selected by a user, and/or automatically determined by code), for automatically mapping a certain combination of values of the driving parameters to one predefined driver model. Exemplary classifiers include: Markov chains, one or more neural networks of various architectures (e.g., artificial, deep, convolutional, fully connected), support vector machine (SVM), logistic regression, k-nearest neighbor, decision trees, sets of rules, and a mapping table.

Optionally, the predefined model of the driver is computed based on an aggregation of monitoring data collected by one or more monitoring devices (e.g., sensors 104B) for multiple real drivers during actual driving of vehicles having the ADAS system installed therein, and optionally under defined environmental conditions which may be obtained for example, based on historical data as described herein (e.g., collected from traffic servers and/or meteorological servers). Monitoring data may be collected based on outputs of sensors that monitor each driver during driving of the vehicle. Sensors may be, for example, installed in the vehicle (e.g., analyzing speed, braking patterns, driving patterns), located externally to the vehicle (e.g., cameras mounted on towers that capture images of the road) and/or located in standalone devices in the vehicle (e.g., analyzing data acquired by a smart phone, such as geographical location data, driving patterns, and speed). The predefined driver model may be inputted into the simulation model, for defining likelihood of how a real driver having the driver profile is predicted to behave and/or react during driving of the vehicle with the ADAS installed therein under the environmental conditions of the environmental profile, according to historical behavior of other real drivers having similar driver profiles, driving similar vehicles with similar ADAS installed therein, under similar environmental conditions.

The predefined model of the driver may define, for example, how the driver being simulated drives the vehicle under different simulated environmental conditions, how the driver uses the ADAS, and/or how the driver reacts to different road scenarios.

The simulation model is defined for the vehicle with installed ADAS being driven by the selected predefined model of the driver, under the predicted environmental conditions defined by the environmental profile.

At 214, a risk of an adverse event during the future time interval is computed by executing the simulation model, to create a simulation of the driver optionally defined by the driver model, driving the selected vehicle having the selected ADAS installed therein under the environmental conditions defined by the environmental profile, over the defined future time interval.

The simulation model may be executed, for example, by computing device 108.

The simulation model may be executed, for example, by a simulation platform which may include a virtual world created by a computer model of streets, traffic, pedestrians, and/or weather. The computer model may be of a real world geographical location, and/or a virtual world not having a direct real geographical counterpart. The simulation model may be fed into the simulation platform, for defining a virtual model of the vehicle for driving through the virtual world. The simulation model may be fed into the simulation platform for defining weather and/or other environmental conditions of the virtual world while the vehicle is virtually driving through the virtual world.

The simulation (or portions thereof) may be presented on a display, for example, for a human user to observe the driving of the vehicle through the virtual world under the defined environmental profile. Alternatively, the simulation is performed internally without necessarily being presented on a display.

As used herein, the phrase execution of the simulation model (and variations thereof) refers to a simulation based on the simulation model.

Optionally, the simulation model is executed for a time interval and/or driving distance which cannot be physically performed by a human during a lifetime.

Optionally, the simulation model is executed for an amount of kilometers, optionally a predefined amount of kilometers, for example, 1 million, or 10 million, or 100 million, or a billion kilometers. The risk of adverse event may be computed according to the number and/or type of simulated adverse events that occurred during the simulated driving over the simulated number of kilometers.

Alternatively or additionally, the simulation model is executed for a predefined time interval, which may be set according to the future time interval. The future time interval may be manually selected, for example, from a list of time intervals, and/or automatically obtained for example, as a pre-defined time interval. Exemplary time intervals include, 1 month, 6 months, 1 year, and 2 years. The future time interval may be defined according to an insurance policy being prepared for insuring the driver driving the vehicle with the installed ADAS. The risk of adverse event may be computed for the future time interval.

Alternatively or additionally, the simulation model is repeatedly executed multiple times, for a predefined amount of kilometers and/or time interval. The iterations may be performed sequentially and/or in parallel (e.g., each processor of a plurality of processors executes one simulation). The risk of adverse event may be computed as a probability, for example, based on the number of simulations in which an adverse event is simulated divided by the number of simulations in which no adverse event occurred or the total number of simulations (in which no adverse event occurs and in which one or more adverse events occurred).

The adverse event may be selected, for example, from a list of adverse events (e.g., by a user via a GUI), and/or predefined. The adverse event may include one or more adverse events. The risk may be computed per adverse event. The risk may be computed for any of multiple adverse events occurring. For example, the risk of the driver causing an accident with another vehicle may be computed. In another example, the risk of damage to the vehicle due to any source (e.g., the driver, other drivers, weather) may be computed.

The risk may be computed, for example, as a probability value over the future time interval (e.g., upcoming year), expected time until the adverse event occurs (e.g., time and/or amount of kilometers), number of adverse events per defined kilometers (e.g., per million kilometers or other values), and/or probability value of occurrence for the next predefined number of kilometers (e.g., for the next 100,000 kilometers or other values).

At 216, an insurance premium for insuring the vehicle having the ADAS installed therein may be computed. The insurance premium is computed according to the risk of adverse event computed by the simulation (i.e., execution of the simulation model). For example, when the simulation results in indicate a relatively high risk of accidents, the insurance premium may be raised accordingly. Vehicles with ADAS installed therein that are shown by the results of the simulation to relatively reduce the risk of adverse event(s) (relative to vehicles without the ADAS installed and/or without another type of ADAS installed) may be rewarded with a relatively lower insurance premium.

The insurance premium may be computed, for example, by computing device 108 executing code 110A, and/or server 116 and/or client terminal 112 executing a code processing the risk of adverse event obtained from computing device 108 over network 114.

The insurance premium may be computed based on the environmental profile.

As discussed herein, the simulation model is computed for a specific driver profile corresponding to a specific human user expected to drive the vehicle, and/or a generic driver profile based on generic demographic parameters that do not necessarily correspond to a specific human user, but may be based on an aggregation of data from multiple drivers having similar generic demographic parameters. Optionally, the insurance premium is computed based on the driver profile used to create the simulation model. The driver profile may correspond to a specific human driver expected to drive the vehicle. Alternatively, the insurance premium is computed based on the generic driver profile used to create the simulation model. The generic driver profile may be based on one or more selected demographic parameters, as described herein. In such a case, the insurance premium may be computed for a driver expected to correlate to the selected demographic parameters, or for any driver that will drive the vehicle.

Alternatively or additionally, the insurance premium is computed for the selected vehicle model and/or sub-model and/or installed features (e.g., upgrades). For example, the insurance premium may be computed for the human driver(s) based on the driver profile(s) driving the vehicle having the selected model and/or selected sub-model and/or selected features (e.g., installed upgrades). In another example, the insurance premium may be computed for the vehicle having the selected model and/or selected sub-model and/or selected features (e.g., installed upgrades) independently of who the driver(s) is. In yet another example, the insurance premium may be computed for the vehicle having the selected model and/or selected sub-model and/or selected features (e.g., installed upgrades) for a generic driver(s) meeting the selected combination of demographic parameters.

The insurance premium may be computed for the future time interval of the simulation. For example, the insurance premium may be computed for the 6 months starting next month, or for the upcoming year, based on the simulation performed for the future 6 months or future year.

At 218, one or more parameters of the vehicle are selected for adaptation thereof, according to a predicted likelihood of reducing the risk of the adverse event.

Optionally, the parameter(s) of the vehicle for adaptation are selected according to an analysis of the executed simulation model. The analysis identifies the predicted likelihood of reducing the risk of the adverse event according to the executed simulation model, for example, based on a simulation of occurrence of the adverse event during execution of the simulation model, and/or based on a simulation of a near occurrence of the adverse event during execution of the simulation model. The parameters of the vehicle during the simulation, which led to at the simulated adverse event and/or which led to a near occurrence of the simulated event may be identified from the simulation, and set as values of the parameters of the vehicle to avoid. For example, when the simulation shows that several accidents occurred and/or several near accidents almost occurred when the vehicle was being driven during the night in narrow poorly lit roads with single lanes, the parameters for adaptation may be selected as prohibiting driving of the vehicle at night in narrow, poorly lit roads with single lanes. Alternatively or additionally, the analysis of the executed simulation model may identify parameter(s) of the vehicle that deviate from a defined requirement during execution of the simulation model, which may be a legal requirement. For example, when the simulation shows that several accidents occurred and/or several near accidents almost occurred when the vehicle was speeding over 10 kilometers an hour above the speed limit, the parameters for adaptation may be selected as prohibiting speeding over 10 kilometers per hour above the allowed speed limit.

Alternatively or additionally, the parameter(s) for adaptation of the vehicle is selected according to an analysis of real historical driving data collected from monitoring devices (e.g., sensors) monitoring real drivers during actual driving of vehicles having the ADAS system installed therein. The real vehicles include vehicles adapted according to the parameter(s) and/or vehicles not adapted according to the parameters. The predicted likelihood of reducing the risk of the adverse event is computed according to the analysis of the historical driving data. For example, adverse event data of vehicles with the ADAS installed therein in which parameters are adjusted is compared to adverse event data of similar vehicles with the ADAS installed therein in which parameters are not adjusted, to compute the additional reduction in risk due to the adjustment of the parameters.

Alternatively or additionally, the parameter(s) for adaptation of the vehicle is selected according to an iteration of the simulation, as described with reference to act 220.

The insurance premium (as described with reference to features 216) may be computed based on the selected parameter(s) for adaptation, for example, based on an agreement that the parameters will be adjusted in the vehicle during the time interval when the insurance policy applies and covers the vehicle.

At 220, one or more features described with reference to 210-218 of FIG. 2 are iterated.

Optionally, an updated simulation model is created by updating the simulation model in which the vehicle with installed ADAS is adapted according to the selected parameter(s). An updated risk of the adverse event is computed by executing the updated simulation model. The updated risk of adverse event, as computed by the updated simulation, is based on an implementation of an adjustment of the selected parameters. An updated (or first instance) insurance premium may be computed for insuring the vehicle having the ADAS installed therein, and where the vehicle is adapted according to the selected parameter(s). For example, the updated simulation model may show that an additional risk reduction (over only installation of the ADAS) is possible if the vehicle is set to prohibit driving 10 kilometers per hour above the legal speed limit. The insurance premium may be further reduced (over only installation of the ADAS) if the vehicle is set to prohibit speeding 10 kilometers per hour above the legal speed limit.

Optionally, another parameter(s) of the vehicle is selected for adaptation during the next iteration. The parameter(s) for adaptation may be selected according to a predicted likelihood of further reducing the risk of the adverse event(s). The features creating the updated simulation model, the computing the updated risk, and the re-selecting another parameter(s) may be iterated until the risk of the adverse event is below a defined threshold, and/or when the risk of adverse event is not statistically significantly further reduced by additional iterations.

Optionally, the one or more parameters of the vehicle selected for adaptation thereof include the vehicle model and/or sub-model and/or installed features (e.g., upgrades). Different models and/or sub-models and/or installed features may be iteratively evaluated by execution of the simulation, for example, for determining which model and/or sub-model and/or installed features may lead to a relatively lower risk of adverse events.

At 222, instructions for adaptation of the selected parameter(s) of the vehicle are optionally generated.

Optionally, the instructions are generated for automatic implementation, for example, code instructions, values of parameters, a script, combined code, binary code, and/or human readable text code. The instructions for automatic implementation may be transmitted, for example, from computing device 108 for to vehicle 104 over network 114. The instructions for automatic implementation may be provided, for example by, transmitting the parameter values to parameter repository 102 of vehicle 104, transmitting the parameter values for adjusting parameters of installed ADAS(s) 104C in vehicle 104, and/or transmitting the parameter values for adjusting parameters of one or more vehicle sub-systems (e.g., ECU 104A.

Alternatively or additionally, the instructions are generated for manual implementation by a user, for manual adjustment of the parameters. For example, the instructions may be presented on a display (e.g., text, video, animation, images), played on speakers (e.g., audio instructions), and/or provided on a physical surface (e.g., printed on paper). For example, the instructions may be for programming and/or adjusting values of parameters, and/or setting values of parameters of one or more of: parameter repository 102, sub-system(s) 104A, and/or ADAS(s) 104C. For example, the instructions may be for manually setting a navigation sub-system to prohibit driving in certain geographical locations, for manually setting an ECU that controls speed to prohibit driving 10 kilometers per hour above the speed limit, and/or for setting the ADAS installed on the vehicle for extra sensitivity in detecting pedestrians.

At 224, the generated instructions may be executed, for implementing the adjustment of the parameters in the vehicle. Instructions implemented as code may be transmitted to the vehicle for automatic implementation thereof. Manual instructions may be followed by the user for manual implementation thereof.

Different implementations of the method described with reference to FIG. 2 are available, based on selective implementation of certain features. Multiple implementations are possible by different combinations of features 204-224 of FIG. 2. For example one or combinations of the following implementations: In one exemplary implementation, all acts 202-224 are implemented. In another exemplary implementation, all acts 202-224, except 216 are implemented, for example, select vehicle parameter(s) for adaptation for reducing risk of adverse event(s) without consideration of insurance premium. In yet another exemplary implementation, acts 202-214 are implemented, for example, to compute risk of adverse event(s) using the selected vehicle model (and/or sub-model and/or installed features) and/or using the selected driver profile and/or selected environmental profile. In yet another exemplary implementation, acts 202-216 are implemented for computing insurance premium. In yet another exemplary implementation, acts 202, 204, 208, 210, 212 and 214 are implemented. In yet another exemplary implementation, acts 202, 204, 208, 210, 212, 214 and 216 are implemented. In yet another example, using any of the combination of features 202-224 described above, where the model and/or sub-model and/or installed features of vehicle of act 204 are selected, and the driver profile of act 206 is a generic driver profile selected for any driver or for driver(s) meeting a selected combination of demographic features. In yet another example, using any of the combination of features 202-224 described above, where the model and/or sub-model and/or installed features of vehicle of act 204 are selected, and the driver profile of act 206 is for one or more human drivers that drive the selected vehicle model and/or vehicle sub-model optionally with the selected installed features.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant ADAS will be developed and the scope of the term ADAS is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for adapting parameters of a vehicle for reduction of likelihood of an adverse event, comprising:
   at least one hardware processor executing a code for:
      performing, for each respective driver of a plurality of drivers:
         obtaining an indication of a vehicle driven by the respective driver;
         obtaining an indication of a selection for installation in the vehicle, of a certain advanced driver assistance system (ADAS) selected from a plurality of ADAS;
         obtaining an environmental profile indicative of a prediction of an environment in which the vehicle with installed ADAS is predicted for driving therein at a future time interval;
         generating and storing a simulation model in which the vehicle with installed ADAS is driving according to the environment profile;
         computing a risk of an adverse event during the future time interval by executing the simulation model; and
         selecting at least one parameter of the vehicle for adaptation thereof according to a predicted likelihood of reducing the risk of the adverse event.

2. The system according to claim 1, further comprising code for: generating instructions for adaptation of the selected at least one parameter of the vehicle.

3. The system according to claim 1, further comprising code for computing an insurance premium for insuring the vehicle having the ADAS installed therein;
   wherein the insurance premium is computed according to the risk of adverse event computed by executing the simulation model and/or for the future time interval of the executed simulation model.

4. The system according to claim 1, further comprising code for:
   creating an updated simulation model by updating the simulation model in which the vehicle with installed ADAS is adapted according to the selected at least one parameter; and
   computing an updated risk of the adverse event by executing the updated simulation model;
   further comprising:
   code for computing an insurance premium for insuring the vehicle having the ADAS installed therein and wherein the vehicle is adapted according to the selected at least one parameter; and/or
   code for selecting another at least one parameter of the vehicle for adaptation thereof according to a predicted likelihood of further reducing the risk of the adverse event.

5. The system according to claim 1, wherein the at least one parameter of the vehicle is selected according to an analysis of the executed simulation model that identifies the predicted likelihood of reducing the risk of the adverse event according to the executed simulation model;

wherein analysis of the executed simulation model comprises:
  identifying at least one parameter of the vehicle during at least one of: a simulation of occurrence of the adverse event during execution of the simulation model, and simulation of a near occurrence of the adverse event during execution of the simulation model and/or
  identifying at least one parameter of the vehicle that deviates from a defined requirement during execution of the simulation model.

6. The system according to claim 1, wherein the selected at least one parameter of the vehicle for adaptation thereof comprises selecting another ADAS system from the plurality of ADAS for installation in the vehicle.

7. The system according to claim 1, wherein the selected at least one parameter of the vehicle for adaptation thereof comprises at least one parameter of a sub-system selected from the group consisting of: driving sub-system, navigation sub-system, multimedia sub-system, and phone sub-system.

8. The system according to claim 1, wherein the selected at least one parameter of the vehicle for adaptation thereof is selected from the group consisting of: adapting of multimedia for use by the driver during driving, set maximum speed limit, define prohibited driving regions.

9. The system according to claim 1, wherein the environmental profile includes one or more parameters selected from the group consisting of: prediction of weather, prediction of vehicle traffic, prediction of pedestrian movement, and prediction of lighting conditions.

10. The system according to claim 1, further comprising code for obtaining a driver profile of a generic driver based on at least one demographic profile.

11. The system according to claim 1, further comprising code for obtaining a driver profile of the driver of the plurality of drivers, including at least one demographic parameter of the driver, a driving history of the driver, and a driving region, wherein the simulation model is defined for the vehicle with installed ADAS being driven by a driver according to the driver profile.

12. The system according to claim 11, further comprising code for selecting a predefined model of a driver from a plurality of predefined driver models by a trained classifier according to the driver profile, wherein the simulation model is defined for the vehicle with installed ADAS being driven by the selected predefined model of the driver.

13. The system according to claim 12, wherein the predefined model of the driver is based on an aggregation of monitoring data collected by a monitoring device for a plurality of drivers during actual driving of vehicles having the ADAS system installed therein.

14. The system according to claim 1, wherein the at least one parameter for adaptation of the vehicle is selected according to an analysis of historical driving data collected from a plurality of monitoring devices monitoring a plurality of drivers during actual driving of vehicles having the ADAS system installed therein and wherein the vehicle is adapted according to the at least one parameter, the predicted likelihood of reducing the risk of the adverse event computed according to the analysis of the historical driving data.

15. The system according to claim 1, wherein the adverse event is selected from the group consisting of: accident caused by the driver of the vehicle, accident to the vehicle caused by another vehicle, no-fault damage to the vehicle due to environmental factors and not due to other vehicles.

16. The system according to claim 1, further comprising code for obtaining at least one of: a model of the vehicle, a sub-model of the vehicle, at least one feature installed in the vehicle, and at least one upgrade feature installed in the vehicle.

17. A system for evaluation of likelihood of an adverse event of a vehicle, comprising:
  at least one hardware processor executing a code for:
    performing, for each respective driver of a plurality of drivers:
      obtaining an indication of a vehicle driven by the respective driver;
      obtaining an indication of a selection for installation in the vehicle, of a certain advanced driver assistance system (ADAS) selected from a plurality of ADAS;
      obtaining an environmental profile indicative of a prediction of an environment in which the vehicle with installed ADAS is predicted for driving therein at a future time interval;
      generating and storing a simulation model in which the vehicle with installed ADAS is driving according to the environment profile; and
      computing a risk of an adverse event during the future time interval by executing the simulation model.

18. The system according to claim 17, further comprising code for obtaining a driver profile, including demographic parameters of the driver, a driving history of the driver, and a driving region, wherein the simulation model is defined for the vehicle with installed ADAS being driven by a driver according to the driver profile.

19. The system according to claim 17, further comprising code for computing an insurance premium for insuring the vehicle having the ADAS installed therein.

20. A method for adapting parameters of a vehicle for reduction of likelihood of an adverse event, comprising:
  performing, per driver of a plurality of drivers:
    obtaining an indication of a vehicle driven by the driver;
    obtaining an indication of a selection for installation in the vehicle, of a certain advanced driver assistance system (ADAS) selected from a plurality of ADAS;
    obtaining an environmental profile indicative of a prediction of an environment in which the vehicle with installed ADAS is predicted for driving therein at a future time interval;
    generating and storing a simulation model in which the vehicle with installed ADAS is driving according to the environment profile;
    computing a risk of an adverse event during the future time interval by executing the simulation model; and
    selecting at least one parameter of the vehicle for adaptation thereof according to a predicted likelihood of reducing the risk of the adverse event.

* * * * *